United States Patent Office 3,436,790
Patented Apr. 8, 1969

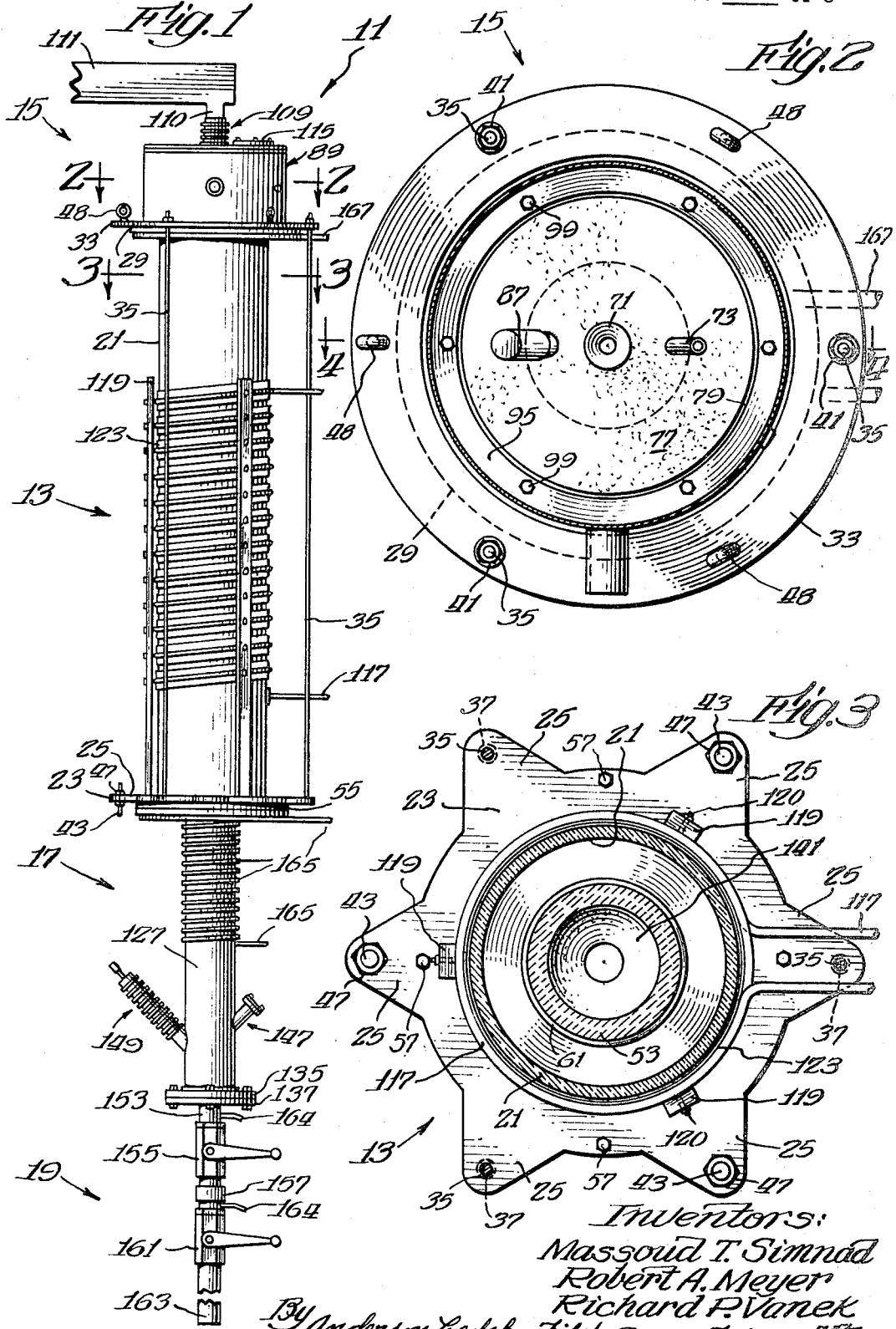

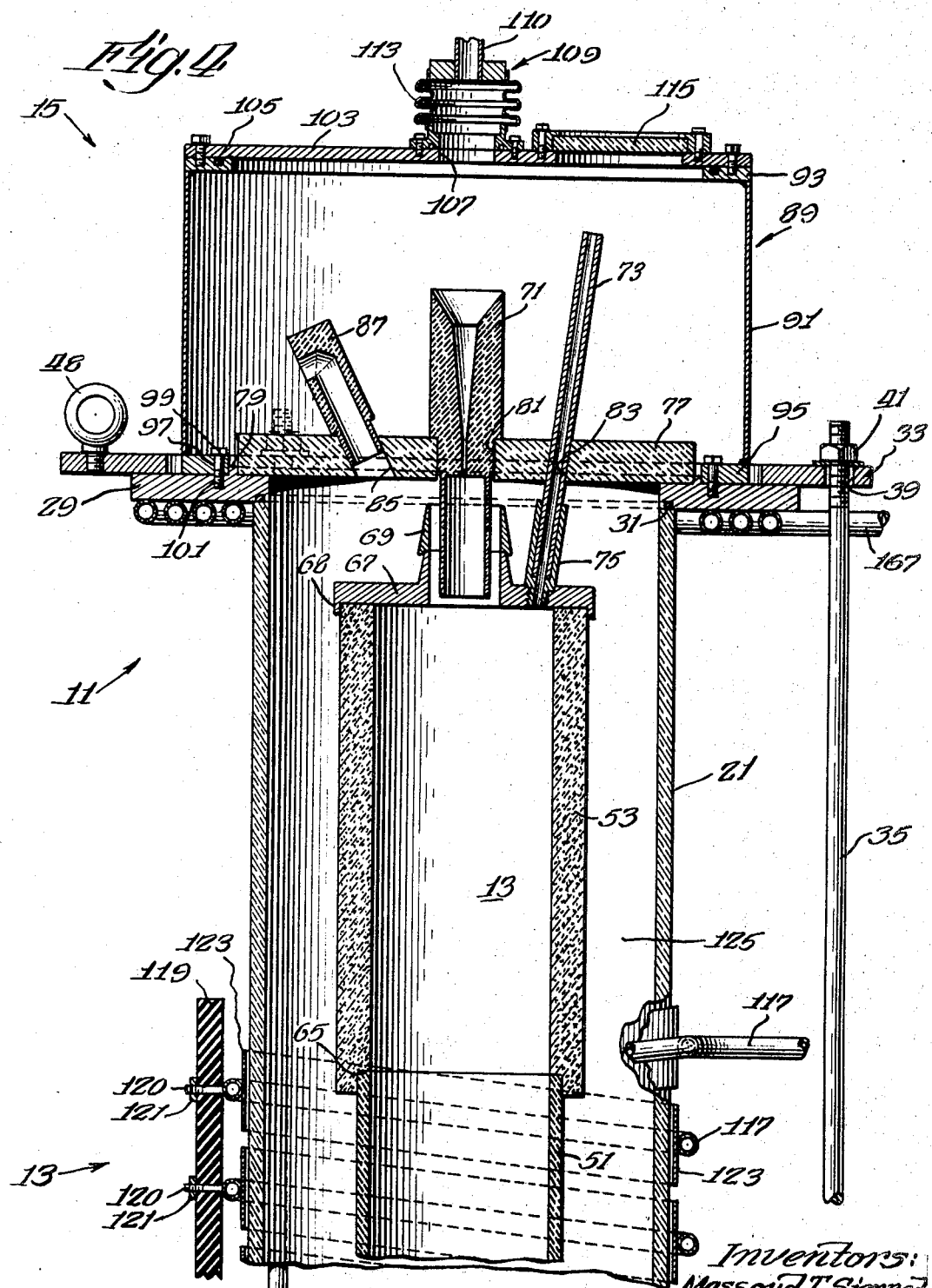

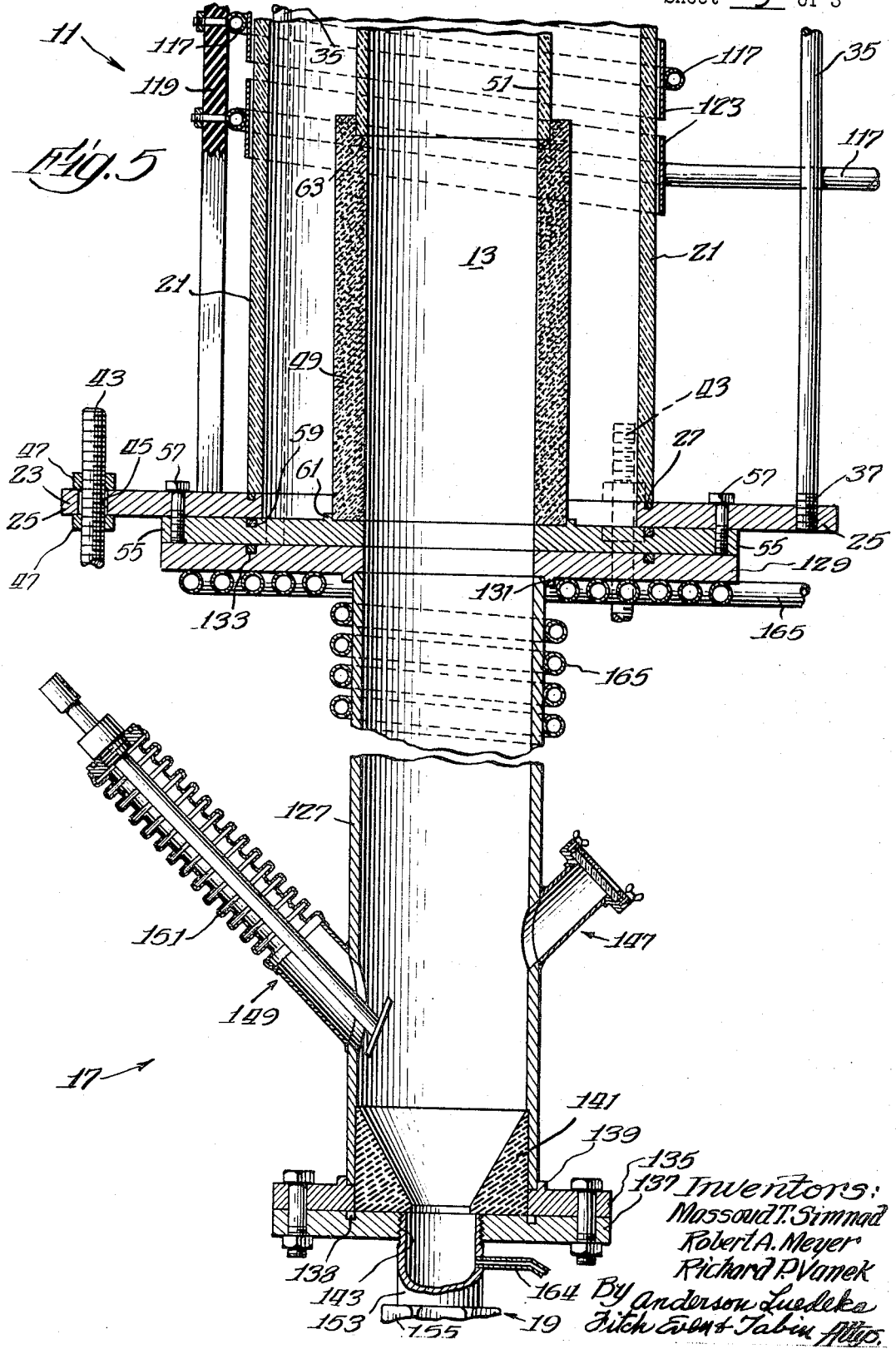

3,436,790
METHOD AND APPARATUS FOR HIGH TEMPERATURE HEAT TREATMENT
Massoud T. Simnad and Robert A. Meyer, La Jolla, and Richard P. Vanek, Solana Beach, Calif., assignors, by mesne assignments, to Gulf General Atomic Incorporated, San Diego, Calif., a corporation of Delaware
Filed Sept. 27, 1963, Ser. No. 312,113
Int. Cl. B29b 1/03
U.S. Cl. 18—1                     5 Claims The present invention relates to high temperature heat treatment and more particularly to a process of and apparatus for preparing nuclear fuel carbides in spheroidized particulate form.

Nuclear fuel carbides, including the monocarbides and dicarbides of uranium, thorium, and plutonium and mixtures thereof, are preferred fuel materials for fuel elements used in various types of nuclear reactors. In certain of these reactors, it has been found advantageous to utilize fuel carbides having dense particulate form and generally uniform size, i.e., in the form of spheroids or pellets of uniform diameter.

Methods for the preparation of particulate nuclear fuel carbides have been generally expensive and time-consuming. Particularly in the case where uniformity of size and shape is required, these methods have necessitated the use of rather complicated equipment, both before and after the formation of the carbides.

In accordance with one previously available method, particles of a mixture of a nuclear fuel and carbon are disposed in a bed of finely divided graphite, the particles being separated from one another to prevent agglomeration. These particles are initially heated above their carburization point. After carburization has taken place, the temperature is increased to a point above the melting point of the carbide in order to spheroidize the carburized particles.

This method has proved effective and commercially feasible. However, it is inherently a batch-type method and has corresponding limitations. Faster and more economical processes for the production of spheroidized nuclear fuel particles are desired.

The principal object of the present invention is to provide an improved process and apparatus for the high temperature treatment of materials. A further object is to provide an improved process of apparatus for the production of nuclear fuel particles. It is another object to provide a continuous process for the production of spheroidal nuclear fuel particles of uniform size. It is a still further object to provide an economical process for the production of dense, spheroidal particles of nuclear fuel carbides having uniform size, and apparatus for carrying out the method. Further objects and advantages of the present invention will be apparent from a study of the following detailed description and of the accompanying drawings wherein:

FIGURE 1 is an elevational view of an apparatus in which a method embodying various features of the invention can be suitably carried out;

FIGURE 2 is an enlarged sectional view taken along lines 2—2 of FIGURE 1;

FIGURE 3 is an enlarged sectional view taken along lines 3—3 of FIGURE 1;

FIGURE 4 is an enlarged sectional view taken generally along the line 4—4 of FIGURE 2 illustrating the upper half of the apparatus; and FIGURE 5 is a sectional view partially broken away similar to FIGURE 4, illustrating the lower portion of the apparatus.

The present invention generally provides a method for the production of spheroidal particles of metallic carbide materials having high melting points. More specifically it provides spheroidal particles of nuclear fuel of uniform size.

In the production of nuclear fuel particles, a starting nuclear fuel material is preferably employed which is not initially in the carbide form so that the steps of carburizing and spheroidizing are carried out simultaneously. The conversion is carried out by preparing particles of a mixture of nuclear fuel metal and a carbonaceous material in desired percentages and passing these particles through a heated zone of a predetermined length and which is maintained at a predetermined temperature. The length and temperature of the zone are so regulated, relative to the size and type of fuel particles being treated, that not only does carburization take place, but the carburized particles are melted in the heated zone. A cooling zone, disposed in series with the heated zone, at the end thereof, solidifies the melted spheres of carbide that leave the heated zone.

Now referring in more detail to the individual steps of the method, nuclear fuel in powdered or fine, granular form is initially mixed together with a carbonaceous material. The nuclear fuel metal may comprise thorium, uranium, or plutonium, and mixtures thereof. Preferably, the fuel is provided in the oxide form, as for example thorium dioxide, uranium dioxide, or mixtures thereof. However, nuclear fuel in metallic form or in carbide form or in a mixture of any of the indicated forms can also be used as the starting material and is considered within the scope of the present invention.

Preferably, graphite is used as the carbonaceous material that is mixed with the nuclear fuel. However, suitable carbon powder, such as reactor grade carbon, or other carbon-containing compounds which can be readily decomposed to carbon, may also be used in the formulation of this initial mixture. Sufficient carbonaceous material is provided to convert the nuclear fuel material to the carbide form, preferably, the dicarbide form. If a hypereutectic mixture of nuclear carbide and carbon or graphite is desired, then a greater amount of the carbonaceous material is used. It is important that not too great an excess of carbon is provided because the unreacted carbon may aggregate and impair the spheroidicity of the particles. Preferably, no more than about 10% excess carbon is used. Naturally, in the situation where the nuclear fuel is initially in the carbide form, less of the carbonaceous material need be used to form such a hypereutectic mixture. However, as previously indicated, in the preferred method, the nuclear fuel is converted to nuclear fuel carbide during the spheroidizing process.

A small amount of a suitable binder material, for example about 2% by weight of the total mixture, is preferably added to the initial mixture in order to more easily prepare the starting particles. Preferably, ethyl cellulose powder is used as the binder, but various other resinous binders such as polyvinyl alcohol, shellac, polymethyl methacrylate, polystyrene, furfural alcohol resin, paraffin, etc. can also be used. It should also be understood that the relative proportions of the nuclear fuel material, carbonaceous material, and binder can be varied depending upon the resultant product desired. Compositions for various nuclear products utilizing preferred constituents are set out in the following table:

TABLE I

| | Constituents | Amounts, percent | Resultant material |
|---|---|---|---|
| (1) | $UO_2$ | 83.35 | $UC_2$ |
| | Graphite | 15.50 | |
| | Ethyl cellulose | 1.15 | |
| (2) | $ThO_2$ | 68.4 | $ThC_2$–$UC_2$ (Th:U=5:1) |
| | $UO_2$ | 13.6 | |
| | Graphite | 16.0 | |
| | Ethyl cellulose | 2.0 | |
| (3) | $ThO_2$ | 78.3 | $ThC_2$–$UC_2$ (Th:U=21:1) |
| | $UO_2$ | 3.7 | |
| | Graphite | 16.0 | |
| | Ethyl cellulose | 2.0 | |

Suitable constituents, as indicated, are thoroughly mixed together and particulated to a desired particle size. No particular method of mixing and particulating is required. The mixing and particulating may be performed in one or more steps. For example, in a one-step process the nuclear fuel material is blended with the carbonaceous material and the binder, and a solvent for the binder is added during the blending. The solvent dissolves the binder and forms a slurry of the constituents. By allowing the solvent to evaporate during the mixing process, agglomeration takes place as desired.

The mixing and particulating step may be carried out in any suitable apparatus. Standard mixers such as a Hobart mixer or a Patterson Kelly Twin Shell Blender may be used. Preferably, the constituents, together with a solvent for the binder, are blended in a blender, and then sieved in a shaker through an appropriate set of screens, in the specific gauges required, utilizing steel balls. Standard shakers are suitable, such as a Ro-Tap shaker, a product of the Braun Chemical Co. The shaker is adapted to force the mixture through a suitable screen of a desired gauge. The particles are then sized on a small screen to remove the fines which are returned to a subsequent batch for reblending. Particles of the size desired can be conveniently obtained by choosing screening materials in the specific gauges required. Depending upon the amount of solvent used, it may be desirable to dry the particles after the particulation step before they are sized on the small gauge screen. Of course, particles somewhat larger than the desired size of the finished spheroidized fuel particles are chosen because of the inherent shrinkage during melting and carburization.

In accordance with the invention, the particles are fed into a heat treatment apparatus wherein the carburization and spheroidization take place. A suitable apparatus 11 for carrying out this step is shown in FIGURE 1.

The illustrated heat treatment apparatus 11 generally comprises an intermediate heating or reaction zone 13, an upper feed zone 15, a lower cooling zone 17, and a bottom collection receptacle 19. The apparatus 11 operates with the aid of gravity, allowing the particles to fall through the respective zones. The heat absorbed by the falling particles in the elongated reaction zone 13 initially causes carburization; immediately thereafter, the carburized particles melt. It is important that the heating of the particles takes place gradually during their fall through the reaction zone 13. This relatively slow heating allows gases to escape without causing splattering or exploding of the particles, especially by gases formed during carburization.

After leaving the reaction zone 13, the melted particles enter the cooling zone 17 where they resolidify during the remainder of the fall, before reaching the bottom collection receptacle 19. The inherent cohesive forces cause the particles to harden to a spheroidal shape.

More specifically, as best seen in FIGURES 4 and 5, the heat treatment apparatus 11 includes an outer furnace tube 21 of heat-resisting material, such as quartz, which houses the intermediate heating or reaction zone 13. The tube 21 is supported on a steel support plate 23. The support plate 23, best seen in FIGURE 3, is of generally ring-shaped formation having six equally spaced, peripheral lugs 25. A groove in the upper face of the plate 23, holds an O-ring 27 that provides a seal between the furnace tube 21 and the plate 23.

An upper plate 29 is disposed atop the upper end of the furnace tube 21. The upper plate 29 includes a groove in its lower surface in which an O-ring 31 is seated that serves as a seal. An outer ring 33 (FIGURE 2) overlies the upper plate 29 and extends outward thereof. Three long threaded rods 35, which are seated in threaded holes 37 in three of the lugs 25 in the support plate 23 extend through holes 39 in the outer ring. Nuts 41 on the upper end of the rods 35 clamp the furnace tube between the upper plate 29 and the lower support plate 23 and also permit easy removal of the furnace tube 21.

The overall apparatus 11 receives its primary support from a supporting structure (not shown) which is connected to the support plate 23 by means of bolts 43, extending through holes 45 in the remaining three lugs 25 and held in place by suitable nuts 47. Three eyebolts 48 sit in the upper surface of the ring 33 and also provide means whereby the upper portion of the apparatus 11 is given stabilizing support.

Concentrically disposed within the furnace tube 21 are three axially aligned sleeves, a lower sleeve 49, a central sleeve 51 and an upper sleeve 53. The three sleeves define the reaction zone 13. The lower sleeve 49 is preferably made of porous carbon and rests upon an intermediate support plate 55 which is connected to the support plate 23 by means of bolts 57. A groove in the upper face of the intermediate support plate 55 holds an O-ring 59 which provides a seal between the two plates. An upstanding ridge 61 formed on the upper surface of the intermediate plate 55 positions the lower sleeve 47 concentrically within the furnace tube 21.

The upper end of the lower sleeve 49 is notched to provide a supporting seat 63 for the central sleeve 51, which is of slightly lesser outer diameter. The central sleeve 51 is made of an electrically conductive, heat resistant material, preferably graphite. The upper sleeve 53 is preferably of porous carbon and is similar in construction to the lower sleeve 49. It contains a notch 65 at its lower end. The notch 65 allows the upper sleeve 53 to be fitted over the upper end of the central sleeve 51 and supported thereon.

As shown in FIGURE 4, the upper limit of the reaction zone 13 is defined by a top reflector plate 67 which caps the upper sleeve 53 upon which it is seated. The plate 67 is held in place by a depending outer flange 68. The top reflector plate 67 includes a centrally disposed upstanding gas release duct 69. Entrance to the reaction zone 13 is by passage through the duct 69 in which the bottom portion of a drop tube 71 is positioned.

To permit the reaction zone 13 to be viewed during the operation of the apparatus 11, an upwardly extending sight tube 73 is provided which is seated in a suitable sleeve 75 that has been threaded into an appropriate aperture provided in the top reflector plate 67.

In the illustrated embodiment, the furnace zone is topped by an upper furnace plate which rests on the upper surface of the upper plate 29. The furnace plate 77 is generally of circular formation and is held in position by an upstanding ridge 79 on the upper surface of the upper plate 29. The furnace plate 67, which is preferably made of graphite, contains a central aperture 81 in which the drop tube 71 is seated. The drop tube 71, also preferably of graphite, funnels down to a fairly narrow inner passageway positioned at the exact center of the furnace tube 21. Thus, the drop tube 71 directs the particles into the very center of the reaction zone 13 so that they fall directly therethrough with minimum contact with the walls of the zone. A slanting hole 83 in the top reflector plate 77 allows the sight tube 73 to pass therethrough. Another slanting passageway 85 provides a seat for a gas outlet 87 which directs the exit of the gases formed during carburization to a filtering system (not shown).

As best seen in FIGURE 4, there is a substantial distance between the bottom of the drop tube 71 and the point where intensive heating begins, i.e. approximately the length of the upper sleeve 53. The arrangement insures that the particles are in free fall before they are heated. As a result, separation of individual particles is assured so that agglomeration is prevented and uniform heating of individual particles is made certain.

As shown in FIGURE 4, a housing 89 surrounds the top of the drop tube 71 and provides a barrier against the atmosphere. The housing 89 includes a cylindrical wall 91, preferably of steel, which is welded to upper and lower flanges 93 and 95. Holes 97 in the lower flange 95 are used to position the housing 89. Bolts 99 passing through the holes 97 are seated in threaded apertures 101 in the upper plate 29. A top plate 103 is appropriately bolted to the upper flange 93 of the housing. An O-ring 105 provides a seal between the plate 103 and the upper flange 93. A central aperture 107 in the top plate 103 serves as an entrance for the particles to the drop tube 71. A suitable entrance fitting 109 provides a seat for an entrance tube 110 extending from an automatic feed device 111, preferably a screw-type feed device. A bellows 113, included in the fitting 109, isolates the housing 89 from any vibration which might be transmitted thereto from the automatic feed device 111. A transparent plate 115 is bolted over another aperture in the top plate and provides an eyepiece through which the sight tube 73 may be viewed.

In the illustrated embodiment, the heat for the reaction zone 13 is provided by a water-cooled, induction heating coil 117 which is helically disposed about the outer surface of the furnace tube 21. Three upstanding support brackets or bars 119 are provided to support the coil 117 in its proper position. Spaced apertures in the support brackets 119 provide passages through which studs 120 attached to the coil 117 extend and are held thereto by nuts 121. The support brackets 119 rest on the upper surface of the support plate.

An accompanying conductive band 123 increases the surface area of each turn of the field-creating induction coil 117. The band 123 is spaced slightly from the outer surface of the furnace tube 21.

The coil 117 is connected to a suitable high frequency electric power source (not shown) and to a suitable supply of cooling water (not shown). The coil 117 is positioned at the level of the central sleeve 51 so that the field set up by the coil intersects the conductive sleeve 51. The rapidly changing field induces eddy currents in the central sleeve 51, thereby heating the same. The heated sleeve provides uniformly intense heat in the area of the reaction zone 13 defined by the sleeve 51.

To insulate the reaction zone 13 and minimize heat loss therefrom, the annular space 125 between the inner wall of the furnace tube 21 and the outer surfaces of the three coaxial sleeves 49, 51 and 53 is filled with a suitable insulating material (not thown). Lampblack, which retains its insulating properties at high temperatures, is the preferred material.

As shown in FIGURE 5, the cooling zone 17 includes a cooling tube 127 preferably of stainless steel, which is disposed immediately below the reaction zone 13. A head plate 129 holds the cooling tube 129 in coaxial alignment with the sleeves 49, 51 and 53 by a depending circular ridge 131 within which the upper end of the tube 127 is seated. The head plate 129, preferably of steel, is secured to the intermediate plate 55 by bolts (not shown) and is suitably sealed thereto by an O-ring 133 positioned in a groove in the upper surface of the plate 129.

At the lower end of the tube 127, a bottom support structure is provided including a ring 135 and a plate 137 bolted together and sealed by an O-ring 138. The ring 135, which surmounts the plate 137, has an upstanding ridge 139 inside of which the lower end of the tube 127 is seated. The bottom support structure is held in this position by suitable braces (not shown) connected to the overall supporting structure (not shown). A graphite funnel 141 is positioned at the bottom of the cooling tube 127 in order to neck the bottom of the cooling tube 127 down to the size of the collection receptacle 19 which is of lesser diameter. The graphite funnel rests on the ring 135. A central threaded aperture 143 in the plate 137 provides connection with the collection receptacle 19.

A sight tube 147 and a retractable mirror 149 are mounted in the side wall of the cooling tube 127 at a level near its bottom. Provision of the sight tube 147 at this location allows the falling particles to be observed during the operation. This visual observation permits close regulation of the continuous operation. The mirror 149, shown in the extended position in FIGURE 5, includes a bellows 151 which permits it to move from a normally retracted position to the extended position shown so that the furnace portion can be viewed without disassembly.

As shown in FIGURES 1 and 5, the bottom collection receptacle 19 includes an upper tubular section 153 which supports an upper ball valve 155. A detachable coupling 157 connects the upper ball valve 155 to a lower ball valve 161 from which a canister 163 depends. The canister 163 is preferably made of stainless steel The detachable coupling 157 allows the canister 163 to be easily removed at the end of a productioin run and emptied.

To establish a purging flow of inert gas upward through the apparatus during its operation, purge gas inlets 164 (FIGURE 1) are disposed in the collection receptacle 19. The purge gas inlets 164 are appropriately connected through tubing and valve assemblies (not shown) to a source of inert gas such as helium or argon.

To assure that the temperature in the cooling tube 127 is sufficiently low to harden the particles while they are still in free fall, copper tubing 165 in wound spirally about the lower surface of the cooling section head plate 129 and then helically about halfway down the outer surface of the cooling tube 127. The tubing 165 is connected to an appropriate source of coolant (not shown). To protect the feed section 15 from the intensive heat present in the reaction zone 13, another cooling coil 167 is also disposed adjacent the lower surface of the upper plate 29.

The dimensions of the heat treatment apparatus 11 may be varied to meet the requirements of specific types of nuclear fuel material intended to be used therein and the particular particle size pellets desired. In one embodiment, the apparatus 11 stands about 12 feet in overall height. The furance tube 21 is 70 inches long and has an inner diameter of 12 inches and wall thickness of ½ inch. The three coaxial sleeves 49, 51, 53 have inner diameters of 5 inches. The central sleeve 51 is 40 inches in length and the upper and lower sleeves 49, 53 are about 14 inches in length. The cooling tube 127 is about 36 inches in length with a 5-inch diameter. The apparatus 11 provides excellent results with feed particles of a nuclear fuel mixture of a size suitable to provide spheroidized particles in a size range of about 50 to about 500 microns. Larger particles can be efficiently produced by lengthening the reaction zone.

Although illustrated in this particular manner, performance of the process is not restricted to this specific apparatus, although this is the preferred apparatus, for other comparable apparatus may also be employed. For example, the initial heating to carburization temperature may take place as the particles are directed down an inclined surface, with the spheroidization and hardening taking place in a manner similar to that hereinbefore described. Alternately, the particles may be thrown or otherwise propelled in a horizontal or even upward direction through similar heating and cooling steps.

The invention is further illustrated by the following examples.

Example I

A 3000 gram batch of a nuclear fuel mixture is prepared utilizing constituents in the ratio specified in Table II below.

TABLE II

| Constituents: | Percentage by weight |
|---|---|
| Uranium dioxide | 83.35 |
| Graphite | 15.5 |
| Ethyl cellulose | 1.15 |

The uranium dioxide and graphite are dry-mixed together in a blender for about 10 minutes. Then, about 600 ml. of trichloroethylene is slowly slurried with the ethyl cellulose and the solution slowly added to the dry ingredients. Mixing is continued until the slurry characteristics have vanished through evaporation of the solvent. The mixture is then dried in an oven at about 150° F. for about 3 hours. The mixture is transferred to a Ro-Tap shaker mill equipped with a 208 micron screen to produce particles of this general size. The particles from the mill are sieved on a 128 micron screen to eliminate the fines. The yield of particles from the sizing operation is about 2000 gms.

The resultant particles are transferred to the hopper of the automatic feed device 111 connected to the reaction apparatus 11 shown in FIGURE 1.

The amperage applied to induction heating coil is controlled so that the central portion of the reaction zone 13 is maintained at a temperature of about 2750° C. An inert gas flow of argon is fed into the purge gas inlets 77 at a rate of about 1000 cc. per minute. Coolant at a temperature of about 57° F. is directed through the cooling tubes 83 and 85 at a rate of about 3 gallons per minute and maintains the cooling zone 17 at a temperature of about 120° F.

The 2000 gram batch of fuel is run through the apparatus in about 2 hours. The resultant particles are sieved first through two 147 micron screen and then a 53 micron screen, with the particles retained on the 53 micron screen being retained as product. These particles constituted about 92% of the total particle batch fed into the hopper.

The retained particles are examined and are found to be dense, generally spherical, and almost 100% in the dicarbide form. Less than 1% is present as uranium monocarbide. These particles are considered particularly well suited for use in high temperature nuclear reactors.

Example II

The process described in Example I was repeated substituting the percentages of ingredients in Table III for the ingredients specified therein:

TABLE III

| Constituents: | Percentage by weight |
|---|---|
| Thorium oxide | 68.4 |
| Uranium oxide | 13.6 |
| Graphite | 16.0 |
| Ethyl cellulose | 2.0 |

As compared to the amount of carbonaceous material used in Example I, graphite is herein provided in an amount in excess of that stoichiometrically necessary for combination with the nuclear fuel metal and reduction of the oxide. In this instance, the excess carbon goes into solution in the nuclear fuel carbide during carburization and melting steps, forming a hypereutectic mixture.

The remainder of the process is carried out as specified in Example I with the temperature of the reaction zone being maintained at about 2600° C.

The resultant particles are sieved on a 53 micron screen and those particles in the size range of about 53 microns to about 500 microns are retained. These particles constitute about 97% of the total particle batch. Examination of the particles shows them to be dense and generally spherical in form. These particles are considered particularly well suited for use in high temperature nuclear reactors.

The invention provides an improved process for the production of spherical particles of metallic carbides. By combining carburizing and spheroidizing operations into a single simple operation, the process is one which can be economically performed. The simplicity of the operation provides for consistency in results and provides a product desirably uniform in size. Furthermore, the apparatus described provides trouble free continuous performance of the process. As pointed out in the description, the invention is especially suitable for the production of nuclear fuel carbides for it permits the easy incorporation of the safeguards mandatory when treating an expensive and hazardous material of this type.

Various of the features of the invention are set forth in the following claims:

What is claimed is:

1. Apparatus for the high temperature treatment of materials in particulate form, which apparatus comprises a reaction zone including three coaxial tubes arranged to form a vertically aligned hollow cylindrical structure, said central tube being formed of conductive material and said other tubes being formed of heat-resistant non-conductive material, means connected to said reaction zone for feeding particles downwardly into said reaction zone, induction coil means encircling said reaction zone and connected to a source of high frequency electrical power whereby eddy currents induced in said conductive central tube provide heat to gradually melt the falling particles so that gases can escape therefrom without impairing said particles, and a cooling zone below said reaction zone for cooling melted particles falling from said reaction zone so that the particles harden in spherical shapes.

2. Apparatus for the high temperature treatment of materials in particulate form, which apparatus comprises a support structure, three vertically extending, coaxial tubes supported by said support structure, said tubes being interconnected in end-to-end relationship to form a reaction zone, said central tube being formed of graphite, and said other tubes being formed of heat-resistant non-conductive material, means connected to said support structure and disposed above the reaction zone feeding particles downward toward said reaction zone, funnel means disposed between said feed means and said reaction zone directing the particles so that they fall into the center of said reaction zone, said funnel means being spaced above said reaction zone so that said particles are falling freely when entering said reaction zone, water-cooled induction coil means mounted on said support structure encircling said reaction zone and connected to a source of high frequency electrical power so that eddy currents are induced in said conductive central tube whereby sufficient heat is provided in said reaction zone to transform falling particles of metal and carbon into metallic carbide and to melt said carbide particles, a band of conductive material connected to said coil means and coextensive with the field-producing portion thereof, first cooling means disposed near the upper end of said reaction zone whereby said particles are kept relatively cool prior to entering said reaction zone, an elongated cooling tube disposed immediately below and coaxial with the lower of said three vertically extending tubes, second cooling means disposed about at least the upper portion of said cooling tube whereby the melted particles falling from said reaction zone are hardened to spherical shaped particles while still in free fall, means connected to said cooling tube for viewing said falling particles, collection means connected to the bottom of said cooling tube wherein the spherical particles are received, and purge gas means connected to said collection means establishing an upward purging flow of gas through said cooling tube and said reaction zone whereby gaseous products are purged from the apparatus.

3. Apparatus for the high temperature treatment of materials in particulate form, which apparatus comprises a support structure, three vertically extending, coaxial tubes supported by said support structure, said tubes being interconnected in end-to-end relationship to form a reaction zone, said central tube being formed of electrically conductive material and said other tubes being formed of heat-resistant non-conductive material, means connected to said support structure and disposed above the reaction zone for feeding particles downward toward said reaction zone, funnel means disposed between said feed means and said reaction zone for directing the particles so that they fall into the center of said reaction zone, said funnel means being spaced above said reaction zone so that said particles are falling freely when entering said reaction zone, induction coil means mounted on said support structure encircling said reaction zone and connected to a source of high frequency electrical power so that eddy currents are induced in said conductive central tube whereby sufficient heat is provided in said reaction zone to melt said falling particles, a cooling zone disposed immediately below the lower end of said reaction zone whereby the melted particles falling from said reaction zone are hardened to spherical shaped particles while still in free fall and collection means in association with said cooling zone wherein the spherical particles are received.

4. Apparatus for the high temperature treatment of materials in particulate form, which apparatus comprises a support structure, a reaction zone including a vertically extending tube supported by said support structure, which tube is formed of electrically conductive material, means connected to said support structure and disposed above the reaction zone for feeding particles downward into said reaction zone, induction coil means mounted on said support structure encircling said reaction zone and connected to a source of high frequency electrical power so that eddy currents are induced in said conductive tube whereby sufficient heat is provided in said reaction zone to melt falling particles, first cooling means disposed near the upper end of said reaction zone whereby said particles are kept relatively cool prior to entering said reaction zone, an elongated cooling tube disposed coaxial with said vertically extending tube at a location immediately below said reaction zone, second cooling means disposed about at least the upper portion of said cooling tube whereby the melted particles falling from said reaction zone are hardened to spherical shaped particles while still in free fall, means connected to said cooling tube for viewing said falling particles and collection means connected to the bottom of said cooling tube wherein the spherical particles are received.

5. Apparatus for the high temperature treatment of materials in particulate form, which apparatus comprises a support structure, three vertically extending, coaxial tubes supported by said support structure, said tubes being interconnected in end-to-end relationship to form a reaction zone, said central tube being formed of electrically conductive material and said other tubes being formed of heat-resistant non-conductive material, means connected to said support structure and disposed above the reaction zone for feeding particles downward into said reaction zone, induction coil means mounted on said support structure encircling said reaction zone and connected to a source of high frequency electrical power so that eddy currents are induced in said conductive central tube whereby sufficient heat is provided in said reaction zone to melt said falling particles, an elongated cooling zone disposed immediately below the lower end of said three vertically extending tubes whereby the melted particles falling from said reaction zone are hardened to spherical shaped particles while still in free fall, collection means located at the bottom of said cooling zone wherein the spherical particles are received, and purge gas means in association with said cooling zone for establishing an upward purging flow of gas through said cooling zone and said reaction zone whereby gaseous products are purged from the apparatus.

References Cited
UNITED STATES PATENTS

| | | |
|---|---|---|
| 2,044,680 | 6/1936 | Gilbert. |
| 2,112,643 | 3/1938 | Baensch et al. |
| 2,676,892 | 4/1954 | McLaughlin. |
| 3,171,714 | 3/1965 | Jones et al. |

WILLIAM J. STEPHENSON, *Primary Examiner.*